United States Patent [19]
Walker

[11] 3,819,003
[45] June 25, 1974

[54] AUTOMATICALLY VARYING POWER STEERING FOR MOTOR VEHICLES

[76] Inventor: Roger Daniel Walker, 4003 Raleigh St., Denver, Colo. 80212

[22] Filed: Nov. 16, 1972

[21] Appl. No.: 307,127

[52] U.S. Cl............................ 180/79.2 R, 92/15
[51] Int. Cl............................................. B62d 5/06
[58] Field of Search............. 180/79.2 R; 92/15, 84; 74/583

[56] References Cited
UNITED STATES PATENTS

| | | | |
|---|---|---|---|
| 665,564 | 1/1901 | Beche | 74/583 |
| 2,819,092 | 1/1958 | Proctor et al. | 180/79.2 R |
| 2,828,721 | 4/1958 | Folkerts | 180/79.2 R |
| 2,838,125 | 6/1958 | Staude | 180/79.2 R |
| 3,183,992 | 5/1965 | Brueder | 180/79.2 R |
| 3,465,842 | 9/1969 | Hruska | 180/79.2 R |

Primary Examiner—David Schonberg
Attorney, Agent, or Firm—Richard D. Law

[57] ABSTRACT

A power steering system device for automatically varying, with respect to speed, the necessary steering forces to be exerted by a vehicle driver, including a centrifugal pump driven by the output drive shaft of the vehicle and a power steering shaft restraining device responsive to the output pressure from the shaft driven pump. As speed of the vehicle increases the driver is required to exert more steering force. The restraining means can be provided in the form of a friction brake which is applied against the steering shaft.

6 Claims, 3 Drawing Figures

PATENTED JUN 25 1974 3,819,003

AUTOMATICALLY VARYING POWER STEERING FOR MOTOR VEHICLES

BACKGROUND OF THE INVENTION

This invention is directed to a device for automatically varying the power assistance applied to the steering system of a vehicle. It is more specifically directed to a device for automatically counteracting the power assistance provided by a power steering system on a vehicle in direct proportion to the speed of the vehicle.

The present invention is primarily intended for use with a conventional power steering system that is commonly found on motor vehicles today. These power steering systems normally include a hydraulic pump and reservoir combination driven by a belt from the engine of the vehicle. A constant pressure is transmitted from the pump to a hydraulically responsive device connected to the steering shaft of the vehicle. Power assistance for providing additional force to turn the wheels of the vehicle is provided during the turning of the steering wheel by the driver. Thus, this additional force is provided to supplement and reduce the turning effort required by the driver.

Under many driving conditions, it has been found that a constant power assist to the steering system of the vehicle is undesirable. A more desirable approach would be to vary the assistance provided so as to be able to minimize the effort required by the driver when the required forces are high, but to permit so-called direct driver steering as the speed of the vehicle increases above a predetermined amount. This is especially true in those types of vehicles which are raced in competition or for fun. It has been found that it is much more desirable, and in some cases even safer, for the driver to have the "feel of the road" when performing high speed manuevers. In this fashion a driver is more responsive to changes in road conditions and provides more accurate control of the vehicle.

This same type of control and response is likewise needed at times on all vehicles whether they be used for sport or racing or as the family passenger vehicle.

Various devices have been attempted in the past to vary the assistance force provided by the power steering system, but these arrangements in general have been inconsistent in providing the required variation of force. One system varies the lateral force transmitted by the power steering system in direct relation to the amount of turning that the driver provided on the steering wheel. Most of these devices have fallen far short of satisfactory results. The biggest problem is in the sensing of the vehicle speed so as to accurately vary the power assistance as the requirements change.

SUMMARY OF THE INVENTION

The present invention is directed to a device which can accurately sense the speed of the vehicle and vary the steering force required to be exerted by the driver in response to this speed. As the vehicle is proceeding slowly or is stopped the power assistance required by the driver for turning the guiding wheels is necessarily high to minimize the required work effort. By the same token, as the speed of the vehicle increases the turning effort required decreases and the necessity for power assistance, also, decreases.

With the present invention, a variable power control is developed by attaching a pump in direct drive relationship to the drive shaft or some other element of the vehicle which senses actual vehicle speed. It is to be understood that this drive could be taken from the speedometer cable of the vehicle, a shaft geared directly from the engine or transmission of the vehicle, or could be driven by the wheels in direct contact with the road.

The output pressure from the pump is connected directly to a device which is designed to snub or restrain the movement of the power steering drive shaft or pitman arm connected to the tie rods and the guiding wheels which in most vehicles are the front wheels. If it is desired to provide a more sensitive arrangement, the assistance pressure created by the existing power steering system can be modified to double the assisting force produced by the system. Thus, the restraining device will be more able to work against a broader range of assisting forces so as to provide more sensitive, variable control to the guiding wheels. In this way, high power assistance would be available at the lower speeds, say from zero to ten miles per hour, with normal power assistance available in the range of twenty to thirty miles per hour. In the range of speed from thirty to sixty miles per hour the effects of the power steering system would be completely negated and the driver would be required to exert full steering force as determined by road conditions. Above sixty miles per hour, the necessary driver force for steering could be increased to a racing type level.

Various types of pump arrangements and restraining devices can be provided for use in this device.

It is, therefore, an object of this invention to provide a device which can automatically vary the steering forces required of a driver of a vehicle in direct proportion to the speed of the vehicle.

It is another object of this invention to provide a system which is both reliable and economical and yet accurately provides "feel of the road" to the driver under varying road conditions.

A further object of this invention is to provide a system which can be attached to a conventional vehicle so as to modify the existing vehicle power steering so as to provide accurate and safe control of the vehicle.

It is a still further object to provide a device which is simple in operation, economical to produce, and easily installed on a vehicle by a mechanic having ordinary skill.

BRIEF DESCRIPTION OF THE DRAWINGS

Other features of this invention will appear in the following description and appended claims, reference being made to the accompanying drawings forming a part of the specification wherein like referenced characters designate corresponding parts in the several views.

DETAILED DESCRIPTION OF THE INVENTION

Referring now more specifically to the drawings, in

Figure 1:
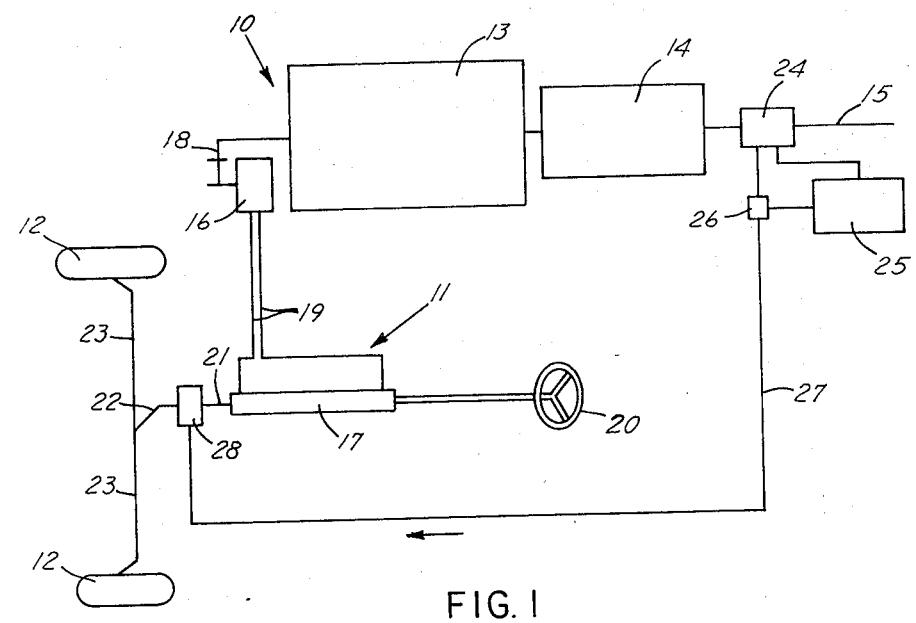
FIG. 1 is a schematic diagram showing the important features of a motor vehicle with the components of the present invention installed thereon.

FIG. 1, a motorized vehicle 10 includes a power steering system 11 provided for assisting the driver in steering the front or guiding wheels 12 of the vehicle. The vehicle includes an engine 13 and transmission 14 for providing power to the driving wheels by means of the drive shaft 15.

The power steering system 11 is comprised of the hydraulic pump and reservoir assembly 16 and power cylinder 17. The pump 16 is driven by a belt and pulley arrangement 18 connected to the crankshaft at the front of the engine 13. Hydraulic lines 19 interconnect the pump 16 with the power cylinder 17. As the driver turns the steering wheel 20 the power cylinder 17 senses this rotation and directs hydraulic pressure in the same direction to turn the steering output shaft 21 and pitman arm 22. Tie rods 23 connect the pitman arm 22 with the front wheels 12. Thus, as is well known, the movements of the steering wheel 20 are transmitted to the guiding or front wheels 12, with power assistance created by the power steering system 11 so as to reduce the turning effort required by the driver in properly controlling and steering the guide wheels 12.

In accordance with the present invention, a centrifugal pump 24 is driven by the drive shaft 15. It is to be understood that this pump can be connected to the shaft 15, such as by installation on the drive shaft, connected to the shaft by means of a pulley and belt arrangement, or any other desired connection. Another alternative would be to drive the pump by means of a power takeoff provided in conjunction with the transmission 14 of the vehicle. The purpose in mounting the pump 24 on the drive shaft or transmission is to permit the pump to sense the actual speed of the vehicle 10. Since the drive shaft 15 is essentially in direct connection with the vehicle wheels the rotative speed of the drive shaft provides a means of operating the pump in direct relation with the road speed of the vehicle.

In this embodiment, a vane type centrifugal pump is provided since this type of pump has a characteristic wherein the output pressure varies with the speed of rotation of the pump impeller. Thus, as the speed of the pump impeller changes in correspondence to the vehicle speed, the output pressure from the pump varies accordingly. The higher the impeller speed, the greater is the output pressure from the pump. It is to be understood that any type of pump which provides this characteristic can be used in this invention.

It is to be further understood that any type of device which can vary output pressure in correspondence with the vehicular speed may be used. A device such as this might be a variable pressure regulator on a constant pressure hydraulic pump. The regulator is controlled by the speedometer or speed of the vehicle. Various other arrangements are possible and would fall within the purview of the present invention.

A reservoir 25 for storage of a sufficient amount of hydraulic fluid is interconnected with the pump 24. A pressure relief valve 26 set at a maximum safe pressure is provided in the output line from the pump 24 so as to bleed fluid back to the reservoir when the pressure exceeds the safe limit. The output pressure from the pump 24 is transmitted by means of a single pressure line 27 to a restraining or snubbing device 28. The restraining device is provided to create a drag or movement restriction on the output steering shaft 21 or pitman arm 22 of the vehicle 10. It is possible that this device could be connected directly to the tie rods of the vehicle which would provide the same effect.

In the present embodiment as shown in FIG. 1, the restraining device 28 is attached to the output steering shaft 21. The device 28 is adapted to increase the drag on the output shaft 21 as the output pressure from the pump 24 increases. The drag increases resistance to the rotational movement of the output shaft in direct proportion to the speed of the vehicle. As the speed of the vehicle increases the drag on the shaft increases variably conteracting the power assist provided. Thus, as the vehicle reaches higher speeds the driver's turning effort required for controlling the vehicle is increased so as to provide an artificial "feel of the road."

If desired, it is possible that the power steering pressure provided by the power steering system 11 can be increased possibly as much as double the normal pressure. In this way, there is provided additional power assist at the slow speeds or while stopped. This power assistance is dissipated by the restraining device 28 variably over the speed range of the vehicle. In the range of approximately 20 to 30 miles an hour the device could be adjusted so as to provide normal power steering assistance, while a stead decrease in the assistance would be experienced in increasing speeds above this range.

It is to be understood that any type of fluid control pressure medium can be pumped by the pump 24 and transmitted to the device 28. This medium could be hydraulic oil, gas, air, brake fluid, anti-freeze solution, or the like.

Figure 2:
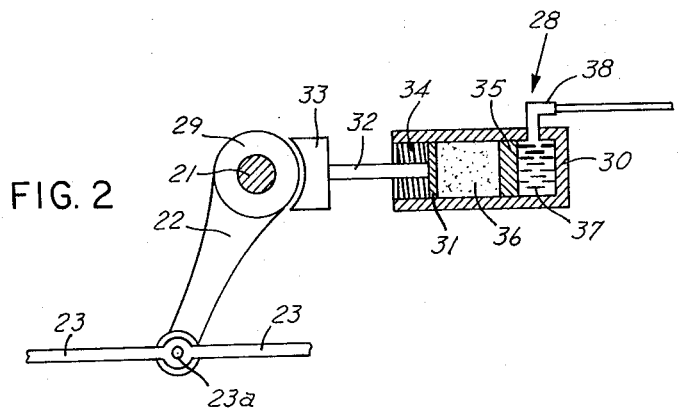
FIG. 2 is a diagrammatic sectional view of a restraining device which is mounted on the output shaft of the power steering system.
Figure 3:
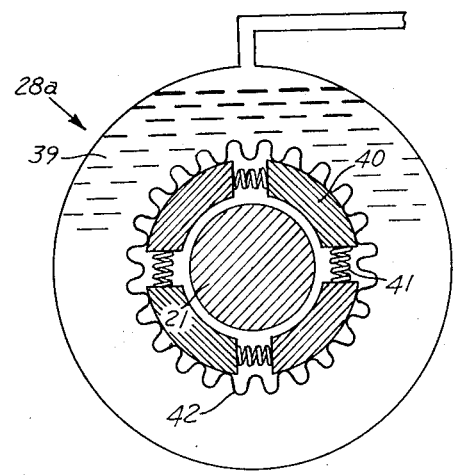
FIG. 3 is a diagrammatic sectional view of another embodiment of a restraining device which can be used with this invention.

In FIGS. 2 and 3 are shown several embodiments of a restraining device which could be used in the system. In FIG. 2, the output steering shaft 21 is connected to the pitman arm 22, which in turn moves the tie rods 23 by means of the connector 23a. A circular collar 29 can be fixedly mounted to the output shaft 21. The restraining force or snubbing device 28 includes a power cylinder 30 mounted transverse to the power steering output shaft 21 and attached to the frame of the vehicle. A piston 31 is slidably mounted in the cylinder 30 and connected to a rod 32. A brake shoe 33 is mounted on the end of the rod so as to rub against the outer surface of the circular collar 29. A spring 34 biases the shoe away from the collar when no internal pressure is provided to the cylinder 30. A free piston 35 can be provided to separate the internal cavity of the cylinder 30 if a gas or air chamber 36 is desired to cushion the operation of the brake shoe 33. The control pressure from the pump 24 is directed to the cylinder inlet 38 and to the power cavity 37. As the pressure within the power cavity 37 is increased the piston 31 is moved outwardly causing the brake shoe 33 to rub against the collar 29 restraining the rotational movement of the collar 29 and the shaft 21. As the power increases this friction, also, is caused to increase. Thus, the drag, on the output steering shaft and the steering system, is variably increased in direct proportion to the increase in hydraulic pressure.

In FIG. 3, another embodiment of a restraining device 28 provides hydraulic pressure directed to a power cavity 39 which surrounds the steering output shaft 21. A plurality of brake shoe or friction elements 40 are provided around the output shaft 21 with springs 41 provided between the elements to bias the elements away from the shaft 21. A contracting band or bellows 42 is mounted around the outer circumference of the brake shoe elements 40 to seal the power cavity 39. As the hydraulic pressure within the cavity 39 is increased, the contracting band 42 pushes equally against the brake shoes 40 causing a frictional drag on the shaft 21. Suitable provision is made to prevent rotation of the brake shoes with the shaft and maintain them in proper position with respect to the device 28a. With this arrangement a restraining effect is provided around the entire periphery of the shaft 21 to restrain movement in either direction.

Another embodiment of the device 28 could be provided by a double acting cylinder connected so as to restrain the movement of the pitman arm itself. Another possibility would be to enclose the pitman arm 22 entirely within a casing and the movement of the pitman arm would be restricted by hydraulic pressure elements. As can be seen any type of restraining device which retards the movement of the steering system in response to the increase or decrease in the control pressure varying with the vehicle speed can be utilized.

While an automatically variable power steering apparatus has been shown and described in detail it is obvious that this invention is not to be considered as being limited to the exact form disclosed in that changes in detail and construction may be made therein within the scope of the invention, without departing from the spirit thereof.

Having thus set forth and disclosed the nature of this invention, what is claimed is:

1. A device for automatically varying the power steering assistance provided to the guiding wheels of a motor vehicle, said motor vehicle including a power steering system having a power pressure source, a power assistance means connected to the steering wheel of the vehicle for reducing the power required to be exerted by a driver and a rotatable power output steering shaft from said power assistance means for steering the guiding wheels of said motor vehicle, said device comprising:
   a. a fluid pump means drivingly connected to the drive shaft of said vehicle, said pump means being arranged to produce a fluid output control pressure which is directly proportional to the speed of the vehicle, and
   b. brake means for engaging said power output steering shaft, said brake means having tubing means connected to said pump means whereby the fluid control pressure actuates said brake means creating a drag force on said output shaft in direct proportion to the speed of the vehicle so as to counteract said power assistance means as the vehicle increases in speed.

2. A device as defined in claim 1 wherein:
said pump means is a vane-type centrifugal pump.

3. A device as defined in claim 1 wherein:
said brake means includes an actuation cylinder having a first internal piston which is connected to a brake device contacting said steering output shaft and a free floating piston mounted within the cylinder and spaced from said first piston by a gas-filled, pneumatic chamber, said first piston and said free floating piston being arranged within said cylinder for slidable longitudinal movement, the fluid output pressure being applied to one side of the free floating piston opposite the first piston so that an increase in control pressure moves the free piston towards said first piston compressing the gas within the said pneumatic chamber so as to apply a cushioned force against said first piston and said braking device to increase the drag force on the output shaft as the vehicle speed increases.

4. A device as defined in claim 3 wherein:
said actuation cylinder includes a helical spring biasing means mounted within said cylinder to bias said first piston so as to hold the braking device away from said shaft when the vehicle is moving slowly.

5. A device as defined in claim 1 wherein:
said brake means includes an enclosed pressure housing mounted so as to surround said steering shaft, said housing having a plurality of braking pads internally arranged within said housing around said shaft, said brake pads being interconnected by a flexible diaphragm member so as to form an annular pressure chamber between said diaphragm and said housing, said fluid output pressure being connected to said pressure chamber whereby an increase in pressure compresses said brake pads against said shaft to create the drag force as the vehicle speed increases.

6. A device as defined in claim 5 wherein:
said pressure housing includes spring biasing means arranged between said braking pads to move said braking pads away from said shaft when the vehicle is moving slowly.

* * * * *